H. H. WEST.
CIRCULAR KNITTING MACHINE.
APPLICATION FILED MAR. 4, 1914.
1,117,936.
Patented Nov. 17, 1914.
7 SHEETS—SHEET 1.
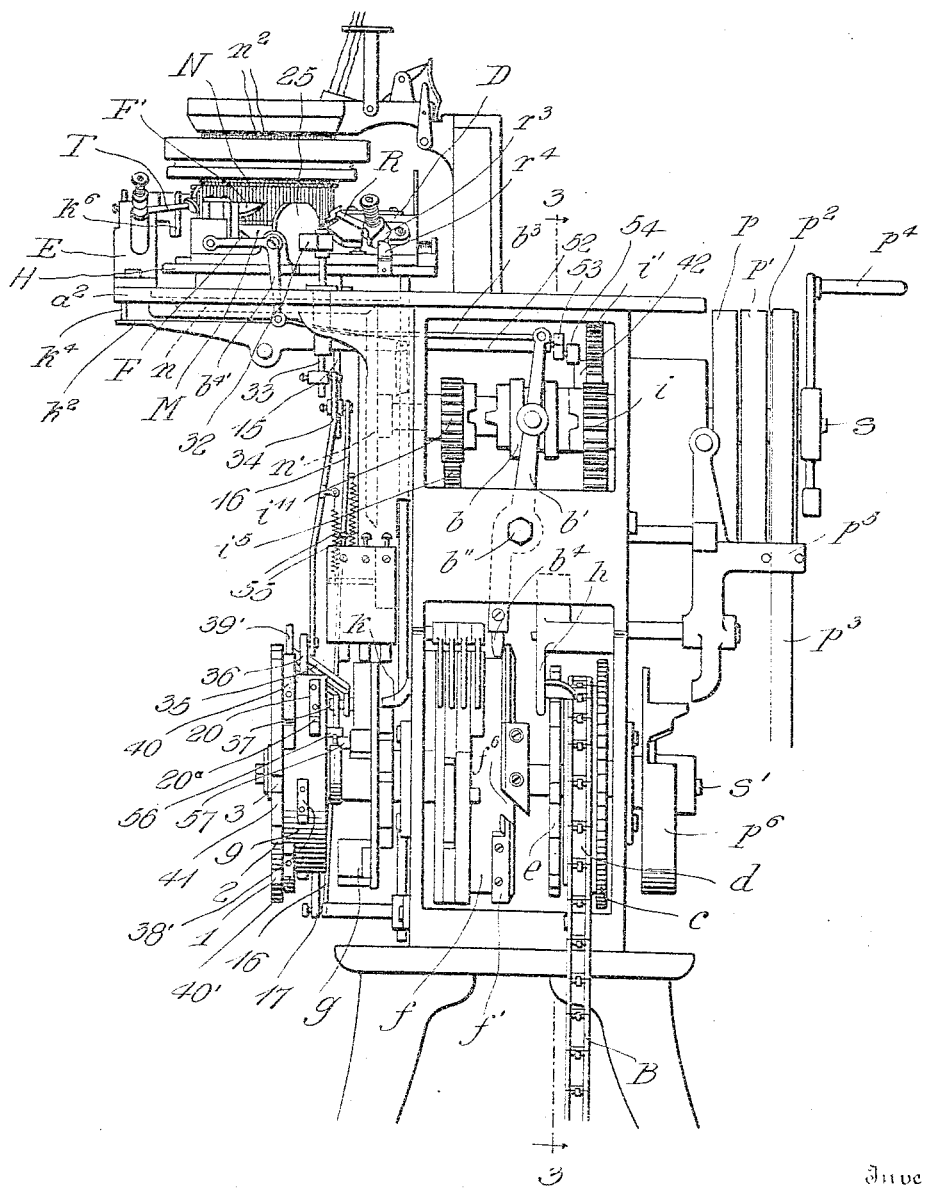
Witnesses
C. Alexander
H. Woodard
Inventor
Harry H. West
By H. B. Willson & Co.
Attorneys

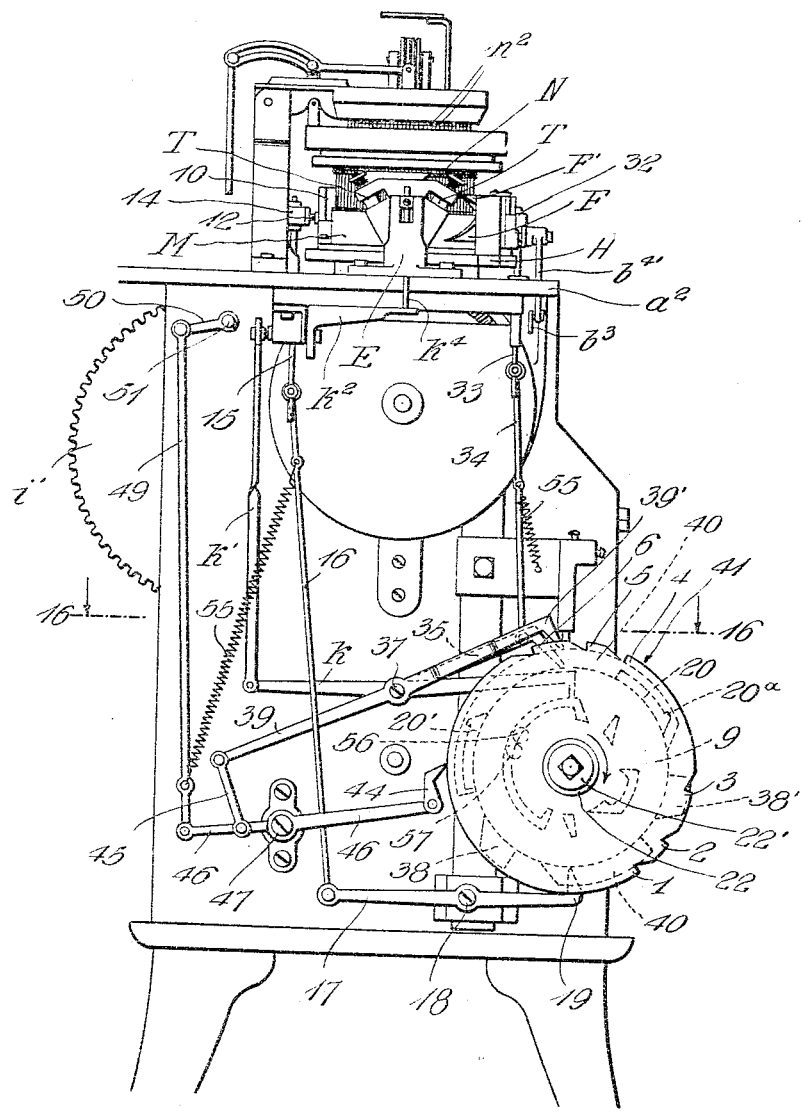

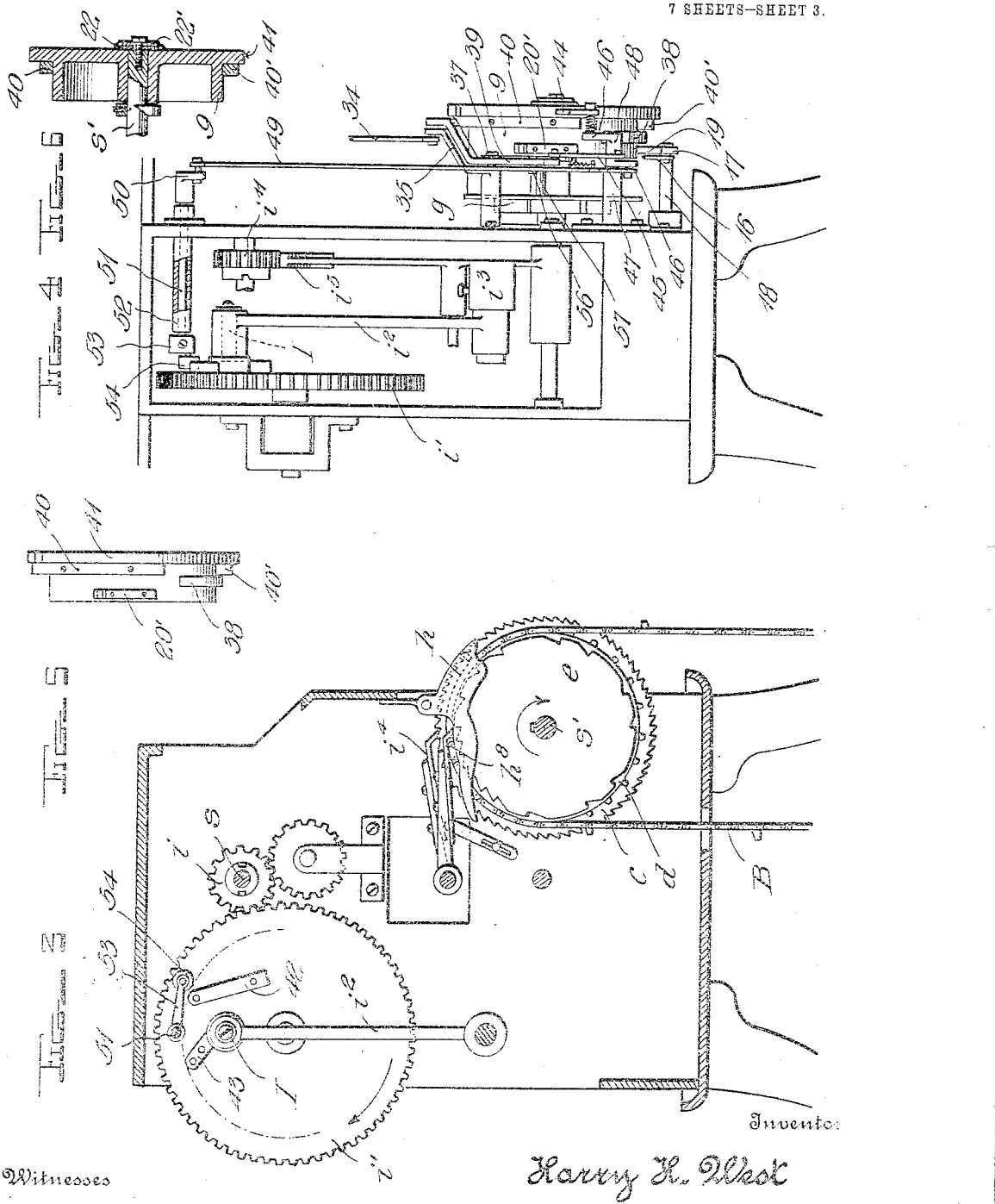

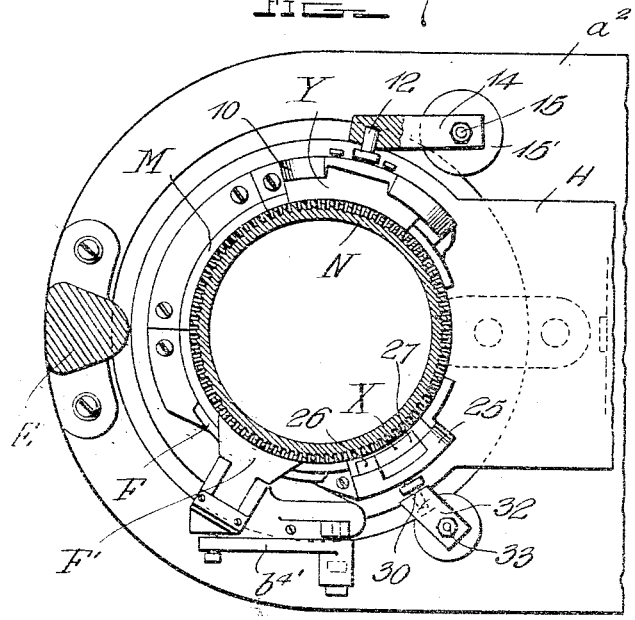
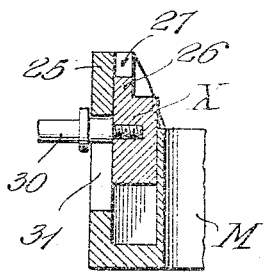
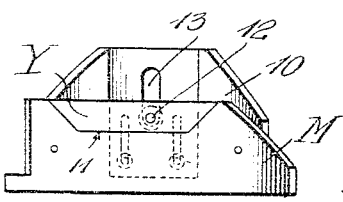
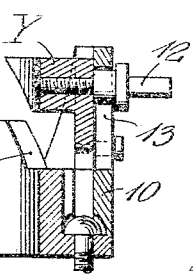
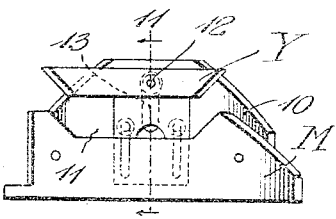
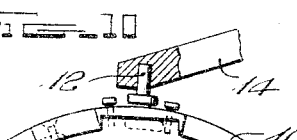
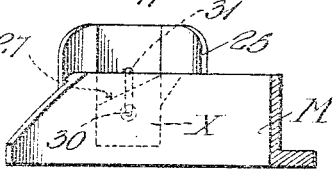
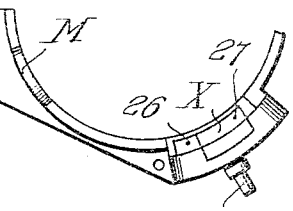
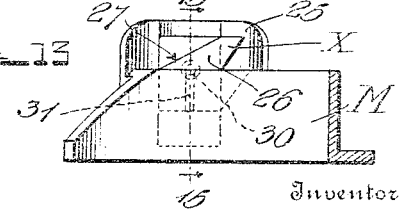

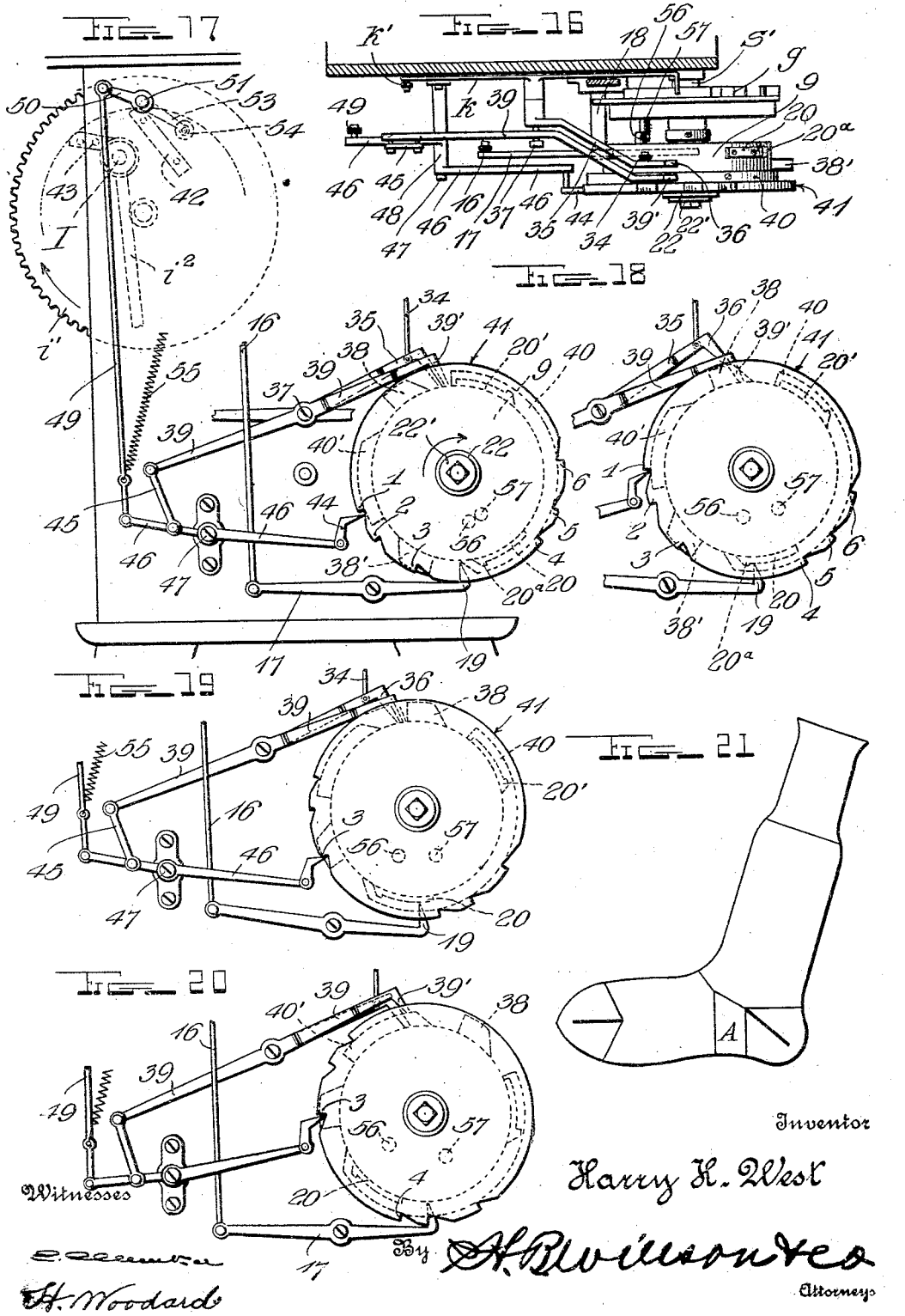

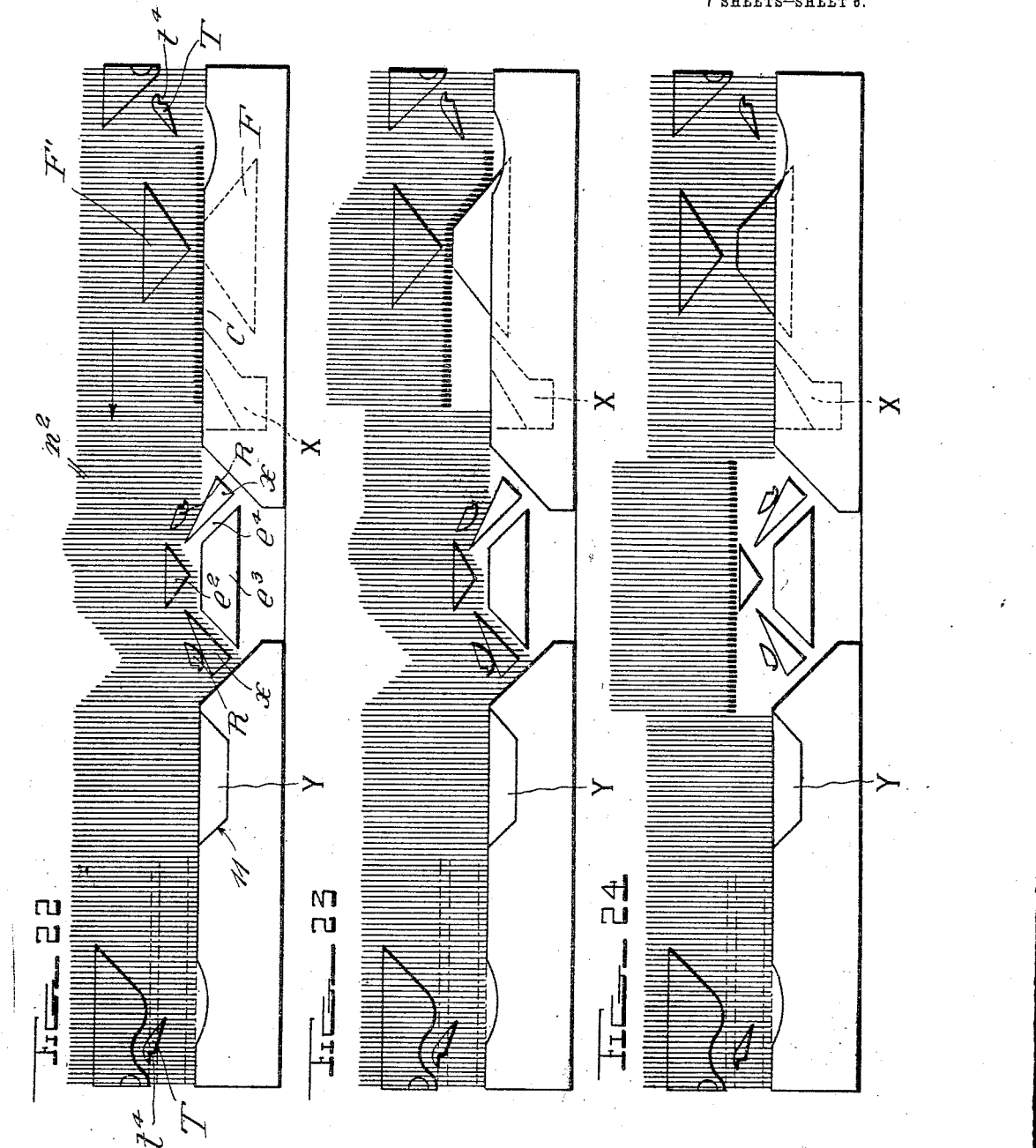

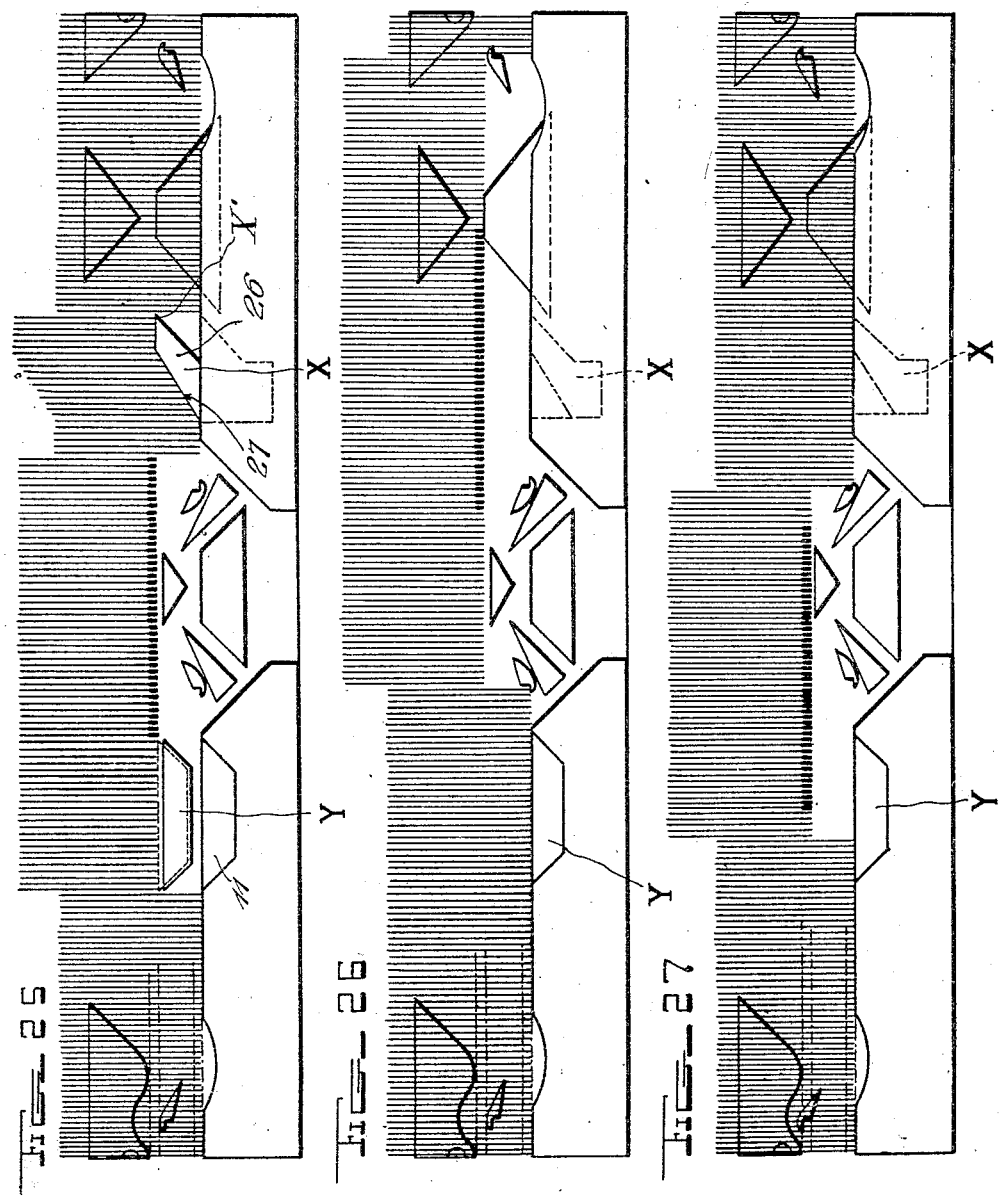

UNITED STATES PATENT OFFICE.

HARRY H. WEST, OF PLYMOUTH, PENNSYLVANIA.

CIRCULAR-KNITTING MACHINE.

1,117,936.

Specification of Letters Patent. Patented Nov. 17, 1914.

Application filed March 4, 1914. Serial No. 822,436.

*To all whom it may concern:*

Be it known that I, HARRY H. WEST, a citizen of the United States, residing at Plymouth, in the county of Luzerne and State of Pennsylvania, have invented certain new and useful Improvements in Circular-Knitting Machines; and I do declare the following to be a full, clear, and exact description of the invention, such as will enable others skilled in the art to which it appertains to make and use the same.

This invention relates to improvements in circular knitting machines of the class especially constructed and adapted for knitting seamless stockings and socks.

The principal object of the invention is to provide simple and efficient mechanism for producing a stocking or sock which perfectly fits the foot and ankle without either stretching or wrinkling.

The hosiery in common use at the present day is fundamentally a narrow bag or tube with a pouch at one point for the heel and which is shaped by stretching and shrinking on form boards. Even after this process, the angle of the foot with the leg is such that if the human foot were held as the sock is shaped, the wearer would be walking on his toes or in shoes with heels six inches high. The human foot extends from the leg at about right angles, and when worn, the ordinary stocking above described, is stretched at the heel and wrinkled at the instep to accommodate the foot in this position. The only way to avoid these wrinkles in a stocking of this character is by keeping the stocking pulled up abnormally tight and the strain on the material at the heel and at the instep renders the best yarn frayable under slight wear.

This invention comprehends certain improvements which are especially applicable to the machine shown in my copending applications Ser. Nos. 822,434 and 822,435 filed March 4, 1914 to adapt said machine to be used for making a differently formed stocking from that made by machines of said applications without changing the needles in the cylinder or any of the other main parts, the stocking produced by this machine with the improvements applied being designed to accomplish the same purpose as those produced by the machines of the applications above referred to. Unless the improvements here shown and described be used it would be necessary to disassemble the entire knitting cylinder to change the needles thereof which is a tedious process and entails much labor and the consumption of considerable time.

The machines mentioned above are known to the trade as the "Banner knitting machine" the general structure of which is shown in U. S. patent to Hemphill No. 933,443, dated September 7, 1909, and comprise circular knitting machines, for knitting stockings and socks in which the knitting is performed by a circular series or column of needles which are moved up and down in vertical grooves in the needle cylinder under the action of the knitting cams on the cam cylinder which encircles the needle cylinder, the knitting of the tubular portion of the work forming the leg and foot being performed in continuous circular courses by all the needles under a continuous rotary motion of the needle cylinder, the pouch knitting or "fashioning" for the formation of the heel and toe being performed in arc-shaped courses by a part of the needles (one half being employed in these patented structures) under the reciprocatory motion of the needle cylinder.

From the above, it will be obvious that the needle carrying or knitting cylinder is revolubly but not endwise movable, the needle actuating devices or cams being non-revoluble and normally stationary.

The pattern, as well as the wheels, etc., mounted on the cam shaft, are intermittently rotated at predetermined intervals and in one direction only, by means of controlling mechanism operatively connected with devices through the medium of which the cylinder is rotated at a relatively increased rate of speed while plain or circular knitting is being produced, and revolved at a greatly reduced speed while being actuated in a rotary reciprocatory manner during the formation of the heel and toe portions of the stocking. The power used is transmitted, as indicated in the drawing, through a belt adapted to run in one direction only and at a substantially uniform speed, the arrangement being such that when it shifted onto one pulley, the speed of the needle cylinder is relatively increased and when in engagement with the other pulley, the speed is materially reduced, the machine automatically stopping and locking itself in stationary position when the belt is shifted onto the idler pulley.

Such parts only of the machine as may be necessary to show the connection and operation of the attachments for carrying out this invention will be illustrated herein.

In the accompanying drawings: Figure 1 represents a front elevation of a knitting machine constructed in accordance with this invention. Fig. 2 represents an end elevation thereof viewed from the left of the machine; Fig. 3 is a vertical section taken substantially on the line 3—3 of Fig. 1; Fig. 4 is a fragmentary rear elevation partly in section; Fig. 5 is a side elevation of the cam drum constituting this invention; Fig. 6 is a detail vertical section of said drum constituting a part of this invention; Fig. 7 is a horizontal detail sectional view on an enlarged scale taken through the needle cylinder immediately above the needle controlling cams, the knitting cams being omitted; Figs. 8, 9, 10, and 11 represent respectively one of the cams (Y) for throwing out certain needles preparatory to the narrowing operation, Fig. 8 being a front elevation viewed from the inside of the cam with the cam in lowered inoperative position; Fig. 9 is a similar view with the cam in raised or operative position; Fig. 10 is a plan view thereof with parts broken out; Fig. 11 is a vertical section on an enlarged scale taken on the line 11—11 of Fig. 9 looking in the direction of the arrow. Figs. 12, 13, 14 and 15 represent respectively the other cam for throwing out certain needles preparatory to the narrowing operation, Fig. 12 being a front elevation viewed from the inside of the cam with the cam in a lowered position; Fig. 13 is a similar view with the cam in raised or operative position; Fig. 14 is a top plan view thereof, and Fig. 15 is a vertical section taken on the line 15—15 of Fig. 13. Fig. 16 is a fragmentary horizontal section taken substantially on the line 16—16 of Fig. 2; Figs. 17, 18, 19 and 20 are fragmentary end views respectively of the machine showing the parts for controlling the needle cams (X Y) in their various positions; Fig. 21 is a view showing the article produced by this improved machine; Fig. 22 is a diagram of the inside of the cam cylinder with the needles on the lower working level in the position which is assumed during the circular knitting, the column of needles moving toward the left as shown by the arrow; Fig. 23 is a similar view with the long butt needles being raised into the upper or non-working level by the instep raise cam; Fig. 24 is a similar view with the long butt needles in raised inoperative position; Fig. 25 is a similar view showing the parts in position for beginning the formation of the heel or toe with the cams (Y X) in position for throwing up or into the non-working level sufficient needles at each end of the column of those already elevated to constitute one-half of the whole column of needles; Fig. 26 is a similar view with the parts in the position which they assume during the narrowing for the heel or toe; Fig. 27 is a similar view showing the parts in the positions assumed during the widening operation for the heel and toe.

The drawings show the main instrumentalities of a knitting machine to which the present invention may be applied as comprising a tubular rotary needle cylinder N having a horizontal beveled gear $n$ secured to its lower end with which a driving gear $n'$ meshes. The mechanism for driving said gear $n$ includes a main drive shaft $s$ carrying what will be termed fast, slow and loose pulleys $p$, $p'$ and $p^2$ respectively on which a belt $p^3$ is adapted to be shifted automatically to vary the speed of the machine for knitting the different parts of the hose. A handle $p^4$ is arranged at the outer end of this shaft $s$ for manually operating the shaft when desired.

A clutch member or hub $b$ is keyed to slide on the shaft $s$ and is provided with a peripheral groove for engagement by an operating or shifting lever $b'$ fulcrumed intermediately of its ends on the frame of the machine as shown at $b''$. This clutch is adapted to be moved either to the right or to the left to engage either the gear $i$ or the gear $i''$ loosely mounted on the shaft $s$ when certain parts hereinafter described are to be operated. Operatively connected with the gear $i'$ is an arrangement of gears (not shown) which forms a compound speed gear and when the clutch $b$ is engaged with the gear $i$ and the belt $p^3$ shifted onto the fast pulley $p$ the shaft $s$ will be rapidly rotated and through the gears $n$ and $n'$ will rapidly revolve the needle cylinder N during the continuous rotary knitting.

The needle cylinder N is provided in its peripheral portion with uniformly spaced longitudinal grooves to receive a circular series of independent needles $n^2$ of different forms distinguished one from the others by the difference in the length of their laterally extending butts whereby they may be actuated by different needle controlling mechanism for different purposes.

In the present embodiment about one-fourth of the total number of the needles have long butts and the remainder have short butts for a purpose to be described. These needles are frictionally held in the grooves of the cylinder by the usual spring bands and are vertically movable. A cam plate H is bored to receive the revoluble needle cylinder and is located above and contiguous to said gear $n$ and carries the main knitting or needle operating cams and the narrowing picks which are brought into action during the knitting of the stocking. A non-revoluble needle supporting cam M practically surrounds the lower part of the needle cylinder and is secured to said cam plate H and is adapted to support the active needles at the normal lower level while circular knitting is being produced.

Inter-gearing with, located at the back of and actuated by the continuously revoluble small gear $i$ which turns in one direction only, is suitably mounted a larger gear $i'$ (see Figs. 1, 3 and 4) having a pitman $i^2$, jointed thereto and to a short arm $i^3$ of a pivoted rocking bell crank lever, the long arm $i^5$ of which has a segment-shaped free end with gear teeth cut in its periphery which are in continuous working engagement with the loosely mounted spur gear $i^{11}$ to drive it in a rotary reciprocating manner. The action of the slow speed pulley $p'$ keyed to gear $i$ operates by means of gear $i'$, segment $i^5$, gear $i^{11}$, etc., to rotate the shaft $s$ and the cylinder N back and forth when the clutch hub $b$ is moved toward the left and interlocks with the gear $i^{11}$ and the last named gear revolves the shaft $s$, its speed ratio being very much reduced thereby or in other words the driving belt will revolve pulley $p'$ several revolutions to one of the cylinder and by means of the arrangement of gear described the speed of the revolving knitting cylinder is increased with respect to the speed of the driving belt when producing circular work and materially decreased while knitting the heel and toe portions as when the cylinder is actuated in a rotary reciprocating manner.

To the front end of the intermittently movable cam shaft $s'$ is secured a cam $p^6$ for controlling the movements of the spring pressed belt shipper $p^5$ the latter being in yielding contact therewith. A cam drum $f$ and cam wheel $g$ fully described in the patent above referred to are also mounted on this shaft $s'$ and at the rear or left end of said shaft is mounted a cam drum 9 for a purpose to be described.

A horizontal spring pressed cam carrying block D is movably guided in an endwise direction toward and from the cylinder N and on which are mounted the main knitting or needle operating cams and the narrowing picks R. Mounted on this block and secured to its inner or working face is the upper central guide member $e^2$ and the lower central guard member $e^3$ shown in Figs. 22 to 27 and the space $e^4$ between them forms a path for guiding the needle butts. The oppositely disposed or right and left wedge-shaped knitting cams $x$, $x$ usually termed "raise and draw cams" are also mounted on this block. The upper sides of said knitting cams when in use deflect the needles upwardly and the lower beveled sides deflect or draw the needles downwardly and the latter after passing thereunder engage the recessed cam member M and deflect the needles to the top edge thereof all being arranged whereby the device is adapted to impart to the traveling needles the usual wave like movement at the knitting point while the cylinder may be revolving in either direction. The narrowing picks R which are carried by the cam block D each has an arm $r^3$ which when the block D is retracted engage stationary stops $r^4$ secured to the plate H whereby the shanks of the picks are swung upwardly and outwardly out of position to allow the needles to be depressed. These picks R are brought into operation at the beginning of the narrowing operation when the cam shaft $s'$ has been shifted to throw the clutch $b$ into engagement with the gear $i^{11}$ and the belt shipper $p^5$ operated to shift the belt $p^3$ into the slow pulley $p'$ whereby the reciprocation of the needle cylinder is produced. Bolted to the table $a^2$ opposite the narrowing picks is a bracket E in which are pivotally mounted a pair of oppositely disposed spring pressed widening picks T which are operated by means of a rod $k^4$ controlled by a cam member on the cam shaft $s'$.

Mounted on the cam plate H are the instep raise and draw cams F and F' which are controlled by the clutch shifting lever $b'$ through the link $b^3$ and a bell crank lever $b^4$, connected with said instep cams as is clearly shown in Fig. 1 of the drawings hereto attached.

At the narrowing and widening operations for the heel and toe when knitting the stocking shown in Fig. 21, it is to be understood that all of the long butt needles, herein shown as one-fourth of the column and one-fourth of the short butt needles must be temporarily thrown out of action into the non-working level, which is a higher level than that of the needles, which continue in service during this portion of the knitting. Concurrently with the change of movement of the cylinder from continuous circular to reciprocatory rotary knitting the instep cam device F is elevated by means of the horizontal connection $b^3$ jointed to the clutch shipper arm $b'$ whereby all the long butt needles are deflected upwardly by said cam and thrown out of action, (see Figs. 23 and 24,) the diagram shown in Fig. 23 showing this cam F operating to raise the long butt needles and the diagram in Fig. 24 showing them after they have been raised by said cam. Immediately after the long butt needles have been raised by the instep cam a portion of the short butt needles at each end of the column of long butt needles, is raised by the cams Y and X in a manner hereinafter described. Upon actuating the cylinder in a rotary reciprocatory manner the action of the narrowing picks R alternately elevate out of action a short butt needle from each end of this column, the operation being continued until the desired narrowing point is attained. This action adds the short butt needles alternately to the ends of the row of the elevated long and short butt needles thereby decreasing the gap in the latter column and correspondingly increasing the gap in the working column of needles. (See Fig. 26.)

In the widening operation which commences immediately succeeding the narrowing each pick T throws down two needles alternately from each end of the column of elevated or non-working needles to the normal working plane thereby adding to the length of the then remaining comparatively short column of working needles and at the same time increasing the gap between the ends of the column of the non-working needles. The narrowing picks are continued in action throughout the widening process and until the completion of the knitting of the heel or toe portion as the case may be and the resumption of circular knitting at which instant all the picks are rendered automatically inoperative.

In the half hose shown in Fig. 21, which is the product resulting from the improvements constituting this invention, the object is accomplished by the formation of an insert A disposed in front of the heel and produced by continuing the heel widening until the desired point has been attained and which is automatically controlled by a lug suitably positioned on the pattern chain B for changing from reciprocatory to circular knitting at a predetermined point. Prior to the narrowing for the heel and for the toe both of which are knit on one-half of the column of needles it is obvious that it will be necessary to throw a sufficient number of the short butt needles out of action which when added to the long butt needles thrown out by the instep cam F will constitute exactly one-half of the entire column of needles, in order that an equal number of stitches may be provided for forming the joints in the heel and toe. To accomplish this raising of the additional needles at the proper time certain automatically controlled cams are provided for elevating sufficient of the short butt needles on opposite sides of the column of long butt needles which were previously raised by the instep cam F prior to the positioning of the parts for the narrowing for the heel or toe as the case may be. These needle raising cams and the mechanism for operating and controlling them will now be described.

As shown applied in Figs. 1, 2 and 7, diagrammatically in Figs. 22 to 27 and in detail in Figs. 7 to 15, two cams Y and X are mounted in suitable housings 10 and 25 at opposite sides of the block carrying the stitch cams and in position to engage the short butt needles on opposite sides of the column C of long butt needles at predetermined intervals, said column as heretofore stated constituting about one-fourth of the entire column of needles.

The cam Y is preferably constructed as shown in detail in Figs. 8 to 11 having upwardly inclined ends and being concavo-convex longitudinally and mounted to slide vertically in said housing 10 and to seat when lowered into inoperative position in a recess 11 in the upper edge of the cam plate M. The upper edge of the cam Y is flush with the upper edge of the cam M when so seated as shown in Figs. 8 and 22 to 23.

A stud 12 extends laterally outward from the cam Y through a slot 13 in the housing 10 and is loosely engaged with a laterally extended arm 14 attached to a rod 15 guided in a suitable sleeve 15' extending through the base plate $a^2$. This rod 15 is adjustably connected with a pitman or rod 16 the lower end of which is pivotally connected with one end of a horizontally disposed lever 17. This lever 17 is fulcrumed intermediately of its ends on a suitable support 18 and its free end has an inturned nose 19 which is positioned in the path of a cam 20 on the drum 9. This drum is loosely mounted on the left end of the shaft $s'$ and held in frictional engagement therewith by any suitable means, a leather disk 22 being here shown arranged for this purpose between the outer face of the drum and a metal disk 22' secured to the shaft $s'$. It is necessary that this drum be so held to permit it to turn on the shaft independently thereof by means to be described, while its frictional engagement is sufficient to hold it against accidental turning on the shaft.

The cam X, shown in detail in Figs. 12 to 15 and mounted outside the needle supporting cam M in the housing 25 is shown in the form of a substantially rectangular body slidable vertically in the housing 25 and having an obliquely disposed upper end 26 the inclined face 27 of which forms a riding surface for the needles which pass thereover and the straight terminal thereof elevates the needles into the non-working level (see Fig. 25) as will be hereinafter more fully described.

A stud 30 extends laterally outward from the body of the cam X through a slot 31 in the housing 25 and is loosely engaged with a block or arm 32 on the upper end of a rod 33 adjustably connected with a rod or pitman 34. The rod 34 is pivotally connected at its lower end with a lever 35 near the free end of said lever and which lever end is provided with a depending nose 36. The other end of this lever 35 is fulcrumed on a stub shaft 37 extending laterally from the machine frame. The nose 36 of the lever 35 is positioned in the path of a cam 38 on the drum 9 for a purpose to be described.

The drum 9 is provided on its periphery with pairs of cams 20, 20'; 38, 38' and 40, 40' disposed in concentric parallel planes and hraped and positioned to control the raising and lowering of the needle raising cams Y and X to bring them in operation just prior to the narrowing for the heel and for the toe to throw out of action sufficient of the short butt needles which when combined with the long butt needles elevated by the instep cam F constitute exactly one-half of the entire column of needles. The cams 40 and 40' which extend around portions of the drum 9 are here shown arranged near its outer end; cams 20 and 20' near the inner end of the drum and cams 38 and 38' which are the shortest and the highest are shown disposed in the intermediate path or plane between that in which are mounted cams 20, 20' and 40 and 40'. These three cams 40, 38 and 20 are designed to control, through means to be described, the raising and lowering of the cams Y and X prior to the narrowing for the heel. The other cams 38', 40', and 20' are positioned to raise cams Y and X prior to the knitting for the toe as will be hereinafter described in detail. The drum 9 has a toothed rim 41 provided with two series of teeth, three being here shown in each series numbered 1, 2 and 3, and 4, 5 and 6 respectively and the two series disposed apart, for a purpose to be described.

A lever 39 is fulcrumed intermediately of its ends on the stud shaft 37 which also carries the lever 35 and is provided at its free end with a lateral nose 39' positioned in the path of the cams 40 and 40' which hold said nose in elevated position during the greater portion of the revolution of the drum as will be further described hereafter. The other end of the lever 39 is connected by a link 45 with a lever 46 fulcrumed intermediately of its ends on a stub shaft 47 extending laterally from the machine frame. This lever 46 has its ends offset or arranged out of longitudinal alinement by means of a lateral tubular portion 48 arranged intermediately of its ends and through which the shaft 47 extends. The link 45 is connected with the outer short end of said lever 46 between the sleeve 48 and the terminal of said short end which latter is pivotally connected with one end of a pitman 49. The other end of this pitman 49 is pivotally connected with a crank arm 50 which is fixed on a stub shaft 51 which extends through a suitable bearing 52 arranged transversely of the machine frame. On the free end of this shaft 51 is fixed an arm 53 carrying a roller 54 which is positioned adjacent the inner face of the large gear $i'$ and is adapted to be engaged at predetermined periods by cams 42 and 43 secured to the inner face of said gear $i'$ (see Figs. 3, 4 and 17) for a purpose to be described. A dog 44 is pivoted on the free end of the lever 46 and held in spring pressed engagement with the toothed rim 41 being designed to engage the teeth thereof at predetermined intervals as will be hereinafter described.

The levers 17, 35 and 39 are held with their noses in yieldable operative engaging position by means of suitable springs 55 positioned at any desired or suitable point for so holding them.

During the knitting of the leg, heel and foot of the stocking the drum 9 is turned slowly by each movement of the cam shaft $s'$ on which it is frictionally held in a manner above described, being carried around with said shaft by the pins 56 and 57 one of which is mounted on the drum and the other on an adjacent element on the cam shaft $s'$.

The nose 39' of the lever 39 which controls the positions of the roller 54 and consequently the turning of drum 9 on shaft $s'$ travels on the long cam 40 of said drum 9 and is held thereby in raised position as shown in Fig. 2 during the knitting of the leg, of the stocking. The rear end of this lever 39 and of the lever 46 to which it is connected are thereby depressed whereby the upper end of the pitman or rod 49 is drawn down thus lowering the end of the arm 50 and elevating the free end of arm 53 to position the roller 54 out of the path of the cams 42 and 43 carried by the large continuously rotating gear wheel $i'$. The noses 19 and 36 of the levers 17 and 35 respectively also travel on the cam drum 9 without being engaged by their actuating cams during the knitting of the leg and hence the cams Y and X controlled thereby remain inactive during this period. It will thus be obvious that this drum 9 performs no function during the knitting operation above mentioned.

When the leg of the stocking has been nearly completed by knitting in circular courses and just prior to the narrowing for the heel, the parts of the machine are disposed as shown in Fig. 22, all the needles being in operative position. The turning of the cam shaft $s'$ a sufficient distance, controlled by the pattern chain B, and cam wheel $e$ shifts the belt $p^3$ from the fast pulley $p$, on which it has been operating to the slow pulley $p'$ whereby the cylinder is slowed down prior to beginning its reciprocatory movement. The further turning of shaft $s'$ under the action of the pattern chain B and cam wheel $e$ shifts the clutch lever $b'$ to the left and simultaneously with the shifting of the lever $b'$ to the left, the instep cam F is raised through rod $b^3$ and bell crank $b^4$ connected with said clutch shifting lever, and all of the long butt needles C, here constituting one-fourth of the entire column, are raised to the non-working level as shown in Figs. 23 and 24, and the needle cylinder is then ready for reciprocatory knitting to form the heel. At the end of the circular knitting just before the beginning of the reciprocatory knitting, and at the end of each reciprocatory stroke the needle cylinder N stands still for a short period. These rests are due to the lost motion occurring when the wrist pin connection of the pitman $i^2$ passes from one side to the other of the dead center of the gear $i'$ which is a distance of about an inch and a quarter, more or less; also to the taking up of the back lash which occurs between the teeth of the segment gear and the pinion $i^{11}$ and between the teeth of the bevel gears $n$ and $n'$ which latter takes place immediately following that of segment $i^5$ and gear $i'$. During the interval while the cylinder remains stationary at the end of the circular movement the needle raising cams Y and X are elevated and positioned as shown in Fig. 25 at each side of the knitting cams just prior to the narrowing for the heel. This raising of the cams Y and X occurs when the drum 9 has been turned sufficiently to cause the nose 39' of the roller-controlling lever 39 to drop off the straight end of the cam 40 onto the periphery of the drum (see Fig. 17), and the dropping of this lever end through the action of link 45 and pitman 49 positions the roller 54 in the path of the cams 42 and 43. The continued turning of the gear $i'$ causes cam 42 to pass under the roller 54 and raise it a predetermined distance thereby lowering the pitman 49 and with it the outer end of the lever 46 whereby the dog 44 is caused to engage the tooth 1 in the rim 41 of the drum 9 (see Figs. 17 and 18) and turn said drum on the shaft $s'$ a predetermined distance sufficient to cause the projection 20ª on cam 20 to pass under the nose 19 of lever 17 and raise said lever, carrying with it the rod 16 connected with the needle raising cam Y which latter is thus elevated into position to raise at one end of the column C the desired number of short butt needles out of action as shown in Fig. 25. Immediately after these needles are raised the cam projection 20ª passes from under nose 19 of lever 17 and causes the cam Y to drop slightly below the lower ends of the needles just raised thereby into the position shown in Fig. 25 whereby sufficient space is left between the upper edge of said cam Y and the needle ends to prevent any danger of the cam engaging said needle ends on the return stroke of the cylinder. This turning of drum 9 on shaft $s'$ by the dog 44 engaging tooth 1 thereof, causes the stud 56 on said drum to move away from stud 57 on the cam wheel $g$ into the position shown in Fig. 18 and thus prevents the drum being turned with the shaft $s'$. The relative position of these studs during the turning of drum 9 by dog 44 when it engages teeth 1, 2 and 3 of said drum rim, is clearly shown in Figs. 18 to 20.

The cam Y is raised and dropped slightly to the position shown in Fig. 25 at the interval when the cylinder remains still at the end of its circular movement just before the beginning of its first reciprocatory stroke. This interval of rest is so short and the movement of the cylinder on its first reciprocatory stroke follows so quickly that there is not sufficient time to lower cam Y to its seat Y before the begining of the reciprocatory movement without endangering the short butt needles which remain active. Consequently, the cams 20 and 20' are made long enough to retain them under the nose 19 of the lever 17 which controls cam Y, until the cylinder completes its first forward reciprocatory stroke and begins its return stroke, when the cam 20 or 20' as the case may be, moves from under nose 19 and causes rod 16 and the cam Y to drop to the position shown in Figs. 22, 23, 26 and 27. Simultaneously with the raising of cam Y on drum 9 the cam 38 is passed under the nose 36 of the lever 35 thereby raising said lever and elevating the rod 34 and cam X carried thereby into the position shown in Fig. 25 so that the needles on top of this cam X and the needles passing thereover will be raised into the non-working level. The elevation of the cams Y and X raises the required number of short butt needles at each end of the non-working column C to throw out one-half of the entire column of needles which is necessary prior to the narrowing operation for the heel and toe, it being necessary that an equal number of needles must be disposed in the working and non-working columns respectively during this operation in order that the joints in the heel and toe may be properly formed. As shown in Fig. 7 the remote ends of these cams Y and X are disposed at diametrically opposite points to insure the raising thereby into inoperative position, prior to the narrowing for the heel and toe of exactly one-half of the entire column of needles. The cam Y being positioned and held as shown in Fig. 25 provides sufficient space between its lower edge and the upper edge of cam M to permit the passage of the butts of the operative short butt needles during the return or first reciprocatory stroke of the cylinder. When these cams Y and X have been raised, the cylinder begins its return or first reciprocatory stroke and when the last needle to the left of cam X between said cam and the long butt needles has passed the point X' of said cam, the small cam 43 on the gear wheel $i'$ in the meantime has passed under the roller 54 and lowered the rod 49 causing the dog 44 to engage the tooth 2 of the drum 9 and turn said drum on the shaft $s'$ a distance sufficient to cause the cam 38 to pass from under the toe 36 of lever 35 (see Fig. 19) thus causing said toe to drop and carry with it the cam controlling rod 34 thereby lowering the cam X into inoperative position as shown in Figs. 22 to 24, leaving the needles raised thereby in the non-working level, and the cylinder again starts on its second forward stroke and before it reaches its extreme limit thereof the large cam 43 again lifts roller 54 owing to the fact that the large gear $i'$ has in the meantime made a complete revolution and thus brought cam 42 again into the path of the roller 54, and through rod 49 and lever 46 causes dog 44 to engage tooth 3 of the drum rim 41 (see Fig. 20) and turn said drum sufficiently to cause cam 20 to pass from under nose 19 of lever 17 thereby pulling rod 16 down and lowering cam Y into its seat 11 in the cam plate M out of the way of the needles. Simultaneously with the lowering of cam Y the nose 39' of lever 39 rides up on the beveled end of cam 40' and thereby moves the roller 54 out of the path of the cams 42 and 43 where it is held by said engagement of nose 39' with the long cam 40' and the machine is then ready for the narrowing for the heel, which is then knit in the usual manner by first narrowing and then widening and finally closing the heel along the edges of the gores. The widening operation is then continued for a predetermined period until an insert or gore A of the desired width is knit, when under the action of a lug on the pattern chain the cylinder will be again shifted to continuous rotary movement for the knitting of the foot. The foot is then formed in circular courses and shortly before the completion thereof the turning of shaft $s'$ operates the mechanism for shifting the belt from the fast to the slow pulley and after a few more circular courses have been knit the lever $b'$ is moved to the left to cause clutch $b$ to be again shifted to the left to engage gear $i^{11}$ for changing the movements of the cylinder from continuous rotary to reciprocatory. Simultaneously with this shifting of lever $b'$ the instep cam F is raised as above described and the cylinder again stands still until after the stud I on the continuously moving gear $i'$ has passed its dead center. The drum 9 in the meantime has turned to position the teeth 4, 5 and 6 thereof and the cams 40', 38' and 20' in the positions relative to the dog 44 and noses 39' 36 and 19 in which the cams 40, 38 and 20 are shown in Fig. 17. During this interval while the cylinder is still the needle raising cams Y and X are elevated and positioned as shown in Fig. 25 at each side of the knitting cam $x$. This raising of the cams Y and X occurs after the drum 9 has been turned sufficiently to cause the nose 39' of the roller controlling lever 39 to drop off the straight end of the long cam 40 and the dropping of this lever through the action of link 45 and pitman 49 positions the roller 54 in the path of the cams 42 and 43.

The continued turning of the gear $i'$ in the direction of the arrow shown in Fig. 17 causes the cam 42 to pass under the roller 54 and raise it a predetermined distance thereby lowering the pitman 49 and with it the outer end of the lever 46 whereby the dog 44 is caused to engage the tooth 4 in the rim 41 of the drum 9 and turn said drum on the shaft $s'$ a predetermined distance sufficient to cause the projection 20$^a$ on cam 20' to pass under the nose 19 of lever 17 and raise said lever, carrying with it the rod 18 connected with the needle raising cam Y which latter is thus elevated into position to raise at one end of the column C the desired number of short butt needles out of action as shown in Fig. 25. Immediately after these needles are raised the cam projection 20$^a$ passes from under nose 19 of lever 17 and causes the cam Y to drop slightly below the lower ends of the needles just raised thereby into the position shown in Fig. 25 whereby sufficient space is left between the upper edge of said cam Y and the needle ends to prevent any danger of the cam engaging said needle ends on the return stroke of the cylinder.

Simultaneously with the raising of cam Y on drum 9 the cam 38' is passed under the nose 36 of the lever 35 thereby raising said lever and elevating the rod 34 and cam X carried thereby into the position shown in Fig. 25 so that the needles on top of this cam X and the needles passing thereover will be raised into the non-working level. The elevation of the cams Y and X raises the required number of short butt needles at each end of the non-working column C to throw out one-half of the entire column of needles which is necessary prior to the narrowing operation for the toe, it being obvious that an equal number of needles must be disposed in the working and non-working columns respectively during this operation in order that the loopers may properly operate for closing the toe after the widening operation has been completed. As shown in Fig. 7 the remote ends of these cams Y and X are disposed at diametrically opposite points to insure the raising thereby into inoperative position, prior to the narrowing for the toe, of exactly one-half of the entire column of needles. The cam Y being positioned and held as shown in Fig. 25 provides sufficient space between its lower edge and the upper edge of cam M to permit the passage of the butts of the operative short butt needles during the return or first reciprocatory stroke of the cylinder. After these cams Y and X have been raised, the cylinder begins its return or first reciprocatory stroke and when the last needle to the left of cam X between said cam and the long butt needles has passed the point X' of said cam the small cam 43 on the gear wheel $i'$ has passed under the roller 54 and lowered the rod 49 causing the dog 44 to engage the tooth 5 of the drum 9 and turn said drum on the shaft $s'$ a distance sufficient to cause the cam 38' to pass from under the toe 36 of lever 35 thus causing said toe to drop and carry with it the cam controlling rod 34 thereby lowering the cam X into inoperative position as shown in Figs. 22 to 24, leaving the needles raised thereby in the non-working level, and the cylinder again starts on its second forward stroke and before reaching the extreme limit thereof the large cam 42 again lifts roller 54 owing to the fact that the large gear $i''$ has in the meantime made a complete revolution and thus brought cam 42 again into the path of the roller 54, and through rod 49 and lever 46 causes dog 44 to engage tooth 6 of the drum rim 41 and turn said drum sufficiently to cause cam 20' to pass from under nose 19 of lever 17 thereby pulling rod 16 down and lowering cam Y into its seat 11 in the cam plate M out of the way of the needles.

Simultaneously with the lowering of the cam Y the nose 39' of the lever 39 rides up on the beveled end of cam 40 and thereby moves the roller 54 out of the path of the cams 42 and 43 where it is held by said engagement of nose 39' with the long cam 40 and the machine is then ready for the narrowing for the toe, which is then knit in the usual manner by first narrowing and then widening and finally closing the toe along the edges of the gores when the stocking is complete.

In the operation of this machine when the parts are in position for circular knitting to produce the leg of a stocking the machine is set into action by the belt shipper $p^5$ thereby automatically shifting the driving belt from the idler pulley onto the loosely revoluble quick speed driving pulley $p$. The belt while thus passing onto the driving pulley $p$ will necessarily cross the intermediate or slow speed pulley $p'$ thus starting the machine into knitting action more slowly and with less strain upon it than if the pulley $p$ were located immediately contiguous to the idle pulley. The first movement of the revolving knitting cylinder carries the depressed short butt needles in a straight line past the face of the rear knitting cam $x$, the outer ends of the immediately following long butt needles at the same time engaging the cam $e^2$ and being deflected into the path $e^4$ thereby positioning them to engage the downwardly deflecting surface of said rear cam, and passing thereunder while making the first stitch at the same instant that the last of the short butts pass the face of the cam. Simultaneously with this operation the spring of the cam block D automatically advances it and its narrowing picks to the normal working level close to the surface of the revolving needle cylinder, the relation of the several members being substantially as represented in diagram in Fig. 22. In this figure the lower dotted line shown above the edge of the cam M indicates the normal working path of the butts and corresponding with the production of circular or plain knitting. The coöperation of the revolving knitting cylinder and the members of the now positioned cam block D together with the usual cams cause the moving needles to successively receive therein the yarn from properly positioned guides, thereby converting it into new loops and at the same time casting off the old loops or stitches from the tops of the needles into the web revolving with the cylinder. This action of the machine then produces plain or circular knitting each revolution of the cylinder corresponding with one row or course of stitches. The machine continues at the normal fast speed and without change to knit circular work, as in producing the leg portion of the stocking, until the advance pattern chain B brings the proper lug into coöperation with the swinging pawl controlling member $h$. In the meanwhile, however, the cam shaft $s'$ has been advanced about one-sixth of a revolution. At this point or as determined by the relative position of the proper lug on the pattern chain and the members controlled by the resulting movement of shaft $s'$ the first yarn and speed changing actions take place to produce the narrowing for the heel of the stocking. That is to say the engagement of the member $h$ with the proper lug on the pattern chain B allows the lug by means of the pawl $i^4$ to move the ratchet wheel $e$ a predetermined distance thereby correspondingly rotating the cam wheel $f$ and its shaft $s'$ and at the same time causing the lower end $b^4$ of the clutch lever $b'$ to be deflected laterally through an opening $f^6$ of the cam rib $f'$ to the outer or right side, thus sliding the clutch member $b$ to the left into engagement with gear $i^{11}$ thereby also shifting the continuously running belt from pulley $p$ onto pulley $p'$. This materially reduces the speed and at the same time changes the movement of the cylinder from continuous circular to reciprocatory rotary. Concurrently with said change the instep cam F is elevated by means of the horizontal connection $b^3$ jointed to the clutch shipper arm $b'$ whereby all the long butt needles are deflected upwardly by said cam out of action into the non-working level which is indicated by the double row of dotted lines at the left of Figs. 22 to 27.

Fig. 23 shows the instep cam F in the act of elevating the long butt needles, which in this machine constitute about one-fourth of the entire column of needles. All these long butt needles which as before stated constitute about one-fourth of the total number in the cylinder are now elevated into the non-working plane as shown in Fig. 24 and are out of action while the machine in its reciprocating movements forms the narrowing for the heel.

Before the narrowing for the heel is performed it is necessary that one-half of the entire column of needles be raised to the non-working level to enable the needles to properly form the joints for the heel. One-fourth of the column of needles having been elevated by the instep cam on the shifting of clutch $b$ to the left to change the movement of the cylinder from continuous rotary to reciprocatory the other fourth of the needles necessary to complete the one-half which must be thrown out of operation are raised by means of the needle raising cams Y and X which are actuated for this purpose and at this time in the manner above described. The heel is then knit by the joint action of the cylinder and the self dropping angularly swinging narrowing picks R R whereby a short butt needle is thrown up alternately out of action from each end of the column of moving needles during each double reciprotation of the cylinder. This narrowing process is continued until the desired point has been reached which is controlled by a lug properly positioned on the pattern chain which co-acts with the member $h$ to rotate the cam shaft $s'$ and through the medium of a properly positioned cam on the shaft $s'$ the members $k$, $k'$ and $k^2$ elevate the gage plate $k^3$ and the two self rising widening picks T controlled by said plate member so that the recessed portion $t^4$ of said picks are positioned in the path of the inactive short butt needles which have just been elevated by the narrowing picks R, the cylinder still moving in a rotary reciprocatory manner. The function of these widening picks T is to alternately deflect or throw down into action a pair of short butt inactive needles from each end of the gap in the column of elevated or idle needles during each double reciprocation of the needle cylinder. While this is taking place the narrowing picks R are kept working thus producing the well known "two and one" knitting action. This knitting action is continued for any desired predetermined period to form the insert A arranged in front of the heel which lengthens the sole and side of the foot the desired extent about two inches more or less whereby the foot is positioned in a plane at right angles to the leg. A lug on the pattern chain C controls this knitting action automatically and said lug at the proper time is brought into engagement with the member $h$ for releasing and rotating the cam shaft and its members a predetermined distance to properly position the cam $f$ to engage the lower end of the clutch lever $b$ to shift the clutch to the right to engage the gear $i$ and change from reciprocatory to circular knitting and at the same time to shift the driving belt onto the pulley $p$ to resume the leg or quick speed circular knitting to produce the foot portion of the stocking. The continued quick rotation of the cylinder operates to knit the circular or plain portion of the foot and changes to slow just before the narrowing for the toe is to be produced. Then the operation above described relative to the actuation of cams X and Y preparatory to the narrowing for the heel is performed. The toe narrowing and widening are effected in the usual manner and after the knitting of a few circular courses which are utilized in seaming in a well known manner the stocking is complete.

From the above description it will be obvious that the operation of the machine as set forth above will knit a stocking having the usual leg, foot, and toe with an insert formed in the sole and sides of the foot adjacent to and in front of the heel which produces a stocking with a foot disposed substantially at right angles to the leg and with the necessary quantity of material in said foot to prevent stretching at the heel and wrinkling at the instep and to avoid the necessity of pulling up the stocking tight at the heel thereof which has been heretofore necessary to cause it to fit properly over the instep and ankle without wrinkling.

I claim as my invention:

1. In a circular knitting machine the combination with a revoluble needle cylinder having needles slidable therein, a cam shaft, a knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said drum and gear, and connected levers and rods operable by the cams on said drum and gear for throwing into operation the cams for raising the auxiliary needles prior to the narrowing for the heel and for the toe.

2. In a circular knitting machine the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said gear, two sets of cams arranged in concentric planes on said drum, rods, levers connected with said rods and having elements positioned in the path of said drum carried cams, and means controlled by the cam on said gear operating through one of said rods for turning said drum to engage the cams thereof with the elements on said levers for throwing into operation the cams for raising the auxiliary needles just before the narrowing operations for the heel and for the toe begin.

3. In a circular knitting machine the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles, a predetermined number of auxiliary needles, cams on said gear, two sets of cams arranged in concentric planes on said drum, the cams of one set being peripherally alined with those of the other set, rods, levers connected with said rods and having elements positioned in the path of said drum carried cams, and means controlled by the cams on said gear operating through one of said rods for turning said drum to engage the cams thereof with the elements on said levers for throwing into operation the cams for raising the auxiliary needles just before the narrowing operations for the heel and for the toe begin.

4. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said gear, two sets of cams arranged in concentric planes on said drum, rods, levers connected with said rods and having elements positioned in the path of said drum carried cams, said drum being provided with a rim having peripheral notches or teeth, a dog positioned to engage the periphery of said rim and connected with one of said levers, and with a rod controlled by the cams on said gear whereby said dog is caused to engage one of the teeth of said drum rim at predetermined intervals for turning the drum.

5. In a circular knitting machine, the combination with a revoluble needle cylinder having needles slidable therein, a cam shaft, knitting mechanism controlled by said cam shaft, a continuously rotating gear having cams thereon, a cam drum mounted to turn with and on said shaft, said drum being provided on its periphery with two sets of cams, the cams of each set being arranged in concentric planes on said drum, and the corresponding cams of each set being arranged in peripheral alinement with each other, one of the cams of each set being longer than the others, one having a projection at one end thereof and the other being shorter and higher than the others, means for elevating a column of said needles into the non-working level at a predetermined point, vertically movable elements for elevating to the non-working level at both ends of the column of the first raised needles a predetermined number of auxiliary needles, levers having elements positioned in the path of said drum carried cams, rods connecting some of said levers with said vertically movable needle raising elements, a rod connecting another of said levers with means adapted to be disposed in the path of the cams on said rotating gear, a dog connected with said last mentioned rod and lever, and teeth on said drum for engagement by said dog at predetermined intervals controlled by the lever connected with the dog and one of the cams on said drum for rotating said drum on said shaft whereby the levers connected with the needle raising elements are actuated.

In testimony whereof I have hereunto set my hand in presence of two subscribing witnesses.

HARRY H. WEST.

Witnesses:
CHAS. AYEN,
HAROLD HONEYWELL.